C. M. BISHOP.
MECHANISM FOR TESTING AND FOR INSTRUCTION IN THE OPERATION OF AUTOMOBILES.
APPLICATION FILED AUG. 23, 1915.
1,161,920.
Patented Nov. 30, 1915.
Fig. 1.
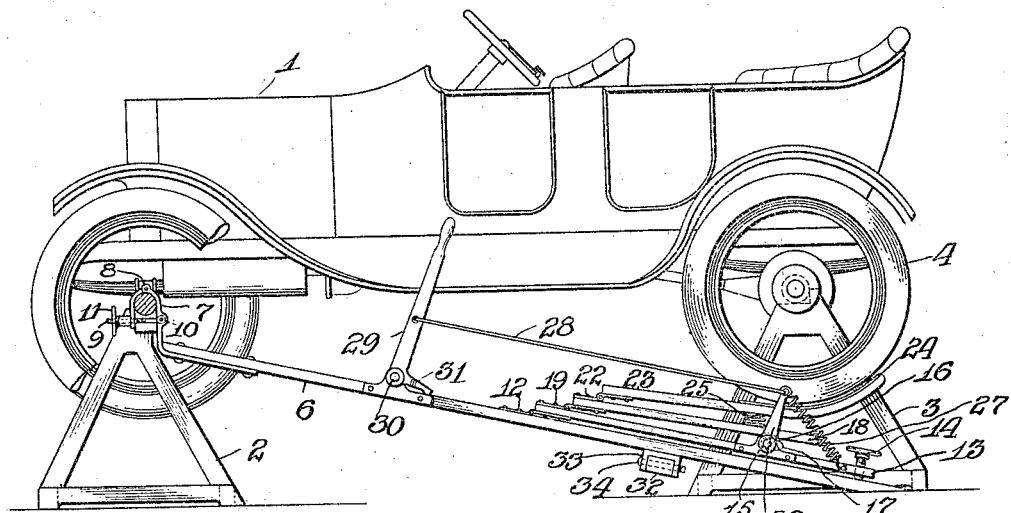
Fig. 2.
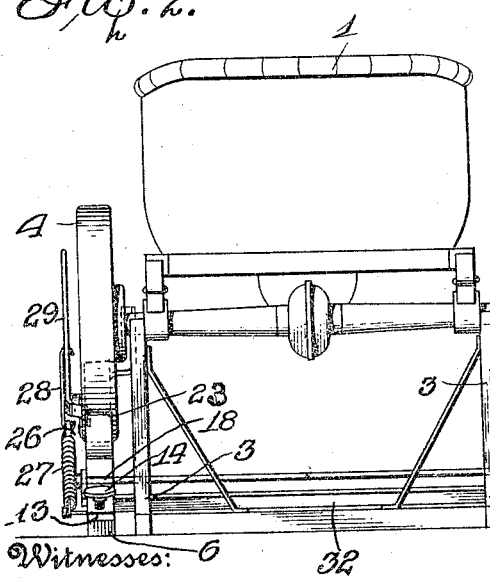
Fig. 3.
Fig. 4.
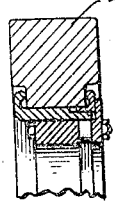
Witnesses:
Inventor
Clifford M. Bishop
By his Attorney
Henry M. Bingham

UNITED STATES PATENT OFFICE.

CLIFFORD M. BISHOP, OF BROOKLYN, NEW YORK.

MECHANISM FOR TESTING AND FOR INSTRUCTION IN THE OPERATION OF AUTOMOBILES.

1,161,920.          Specification of Letters Patent.          Patented Nov. 30, 1915.

Application filed August 23, 1915. Serial No. 47,008.

*To all whom it may concern:*

Be it known that I, CLIFFORD M. BISHOP, a citizen of the United States, residing in the city of New York, in the borough of Brooklyn, county of Kings, and State of New York, have invented certain new and useful Improvements in Mechanism for Testing and for Instruction in the Operation of Automobiles, of which the following is a full, clear, and exact description.

This invention relates to mechanism for testing and for instruction in the operation of automobiles, whereby when an automobile is elevated so that the wheels thereof are out of contact with the ground, conditions which obtain while driving the machine in the ordinary manner may be closely simulated in order that the automobile may be tested and that novices may be readily instructed in the operation of the machine without the dangers incident to such instruction when the machine is driven upon the public highways, and the object of my invention is to provide apparatus which shall be simple in construction and efficient in operation, and which, when the automobile is stationary, will closely simulate the conditions which obtain while driving the machine in the ordinary manner upon the public highways. These and the other objects of my invention will be more fully disclosed in the following specification and claims.

In the drawings which accompany the specification, Figure 1 is a side elevation of an automobile, to which my invention has been attached. Fig. 2 is a rear view of an automobile to which my invention has been attached. Fig. 3 is a detail view of the cam mechanism operating the brake and means for adjusting the brake shoe, partly in section. Fig. 4 is a sectional view of the tire and means for securing the same to the rim.

Similar characters designate similar parts throughout the accompanying drawings.

I mount an automobile 1, upon horses 2 and 3, so that it is suspended with the wheels free from the ground, and in place of the ordinary pneumatic tires I substitute on the rear wheels solid tires 4 and 5, preferably of cast iron and of such weight that the inertia and momentum of these tires when at rest or in motion will closely simulate the inertia and momentum of the car. I attach to the front axles brake supporting members 6, by means of goose necks 7, hinged at 8 and secured in position by the studs 9, pivoted to the goose necks at 10 and wing nuts 11. Hinged to the brake supporting member 6 at 12, is a brake adjusting member 13, the outer end of which may be adjusted with reference to the member 6 by the hand screw 14. Mounted in suitable bearings 15, on the members 13, is a shaft 16, carrying cams 17, adapted to lift the brake member 18 which is hinged to the member 13 at 19. Hinged to the member 18, at 22, is the brake shoe 23, which is provided with a covering 24, of brake lining or other suitable material resistant to wear and heat. The brake shoe is resiliently supported by the spring 25. On one end of the shaft 16 is mounted an arm 26. To the upper end of this arm is secured a coil spring 27, which tends to maintain the cam out of the operative position. To the upper end of the arm 26 is secured a rod 28, the other end of which is attached to the lever 29, which is pivotally connected to the member 6 at 30, which is provided with a stop 31. The members 6 are maintained in the proper space relation to each other by the tie member 32, which is secured in sockets 33 by pins 34.

The operation of my invention is as follows: The automobile is placed upon the jacks 2 and 3. The shoes are then removed from the rear wheels of the automobile and replaced by the metal shoes, weighing preferably from two hundred and fifty to three hundred pounds each. The brake carrying members 6 are then placed in the position shown in Fig. 1 and secured to the front axle near the opposite ends thereof, with the parts in position as shown in Fig. 1. The members 6 are then locked in proper space relation by the tie member 32, and the brake shoes 23 are then adjusted by means of the hand screws 14, so that when the lever 39 is thrown forward to the left the shoes 23 will bear equally against the peripheries of the wheels 4 and 5, so as to produce an even braking effect upon each of the rear wheels. It is apparent that wheels equipped with tires such as I have described will, when at rest, possess inertia which will approximate the inertia of the car when at rest, and when in motion will possess momentum which will closely simulate the momentum of the car when in motion. In using this device for instruction purposes, the pupil to be instructed is placed in the car, lever 29 is thrown forward by the instructor, so as to apply the brakes to the rear wheels with such force as to require approximately the same amount of power to revolve the rear wheels as would be required to start and run the car at a moderate speed upon the road. The pupil is then taught to start the engine, throw the low speed gears into operative relation and change through the various gears to direct drive. The instructor may then notify the pupil of different conditions, such as are encountered in driving under normal conditions, as, for instance, that the car is approaching a steep hill, at the same time bringing the lever 29 still farther forward and applying the brake shoes 23 with greater force to the rear wheels, which necessitates the opening of the throttle and the manipulation of the car mechanism in the same manner which would be required in order to cause the car to climb a steep grade or hill. It is apparent that the brakes may be so applied that it will be impossible for the engine to rotate the rear wheels without changing gears, and, as the rear wheels then possess a momentum which closely simulates the momentum which the car would have acquired if driven at a corresponding speed of the engine, the conditions under which the gears must be changed closely simulate the conditions which prevail in driving up a steep grade. It is also apparent that releasing the brake shoes entirely, closely simulates the conditions which obtain when the car under the usual conditions is running down an easy grade, and, in fact, nearly all conditions of road-work may be closely simulated with my mechanism. In practice I have found that many persons who, through natural timidity, find great difficulty in learning to manipulate or drive an automobile upon the road, are readily taught to do so in an automobile to which my mechanism has been attached and which is at rest, and after having acquired a facility for manipulating the throttle, spark control, brakes, clutch and gear shifting mechanism, are readily taught to drive the car under normal conditions.

It is apparent that the mechanism may be used with great advantage for the purpose of testing the engine and driving mechanism under conditions which closely simulate the conditions which obtain in driving an automobile along the public highways.

Having described my invention, I claim:

1. An apparatus of the class described, comprising means for maintaining an automobile in a position where the rear wheels are free to revolve, weighted rear wheels, and braking mechanism independent of the car brakes.

2. An apparatus of the class described, comprising means for maintaining an automobile in a position where the rear wheels are free to revolve, tires mounted upon the rear wheels possessing an inertia approximating the inertia of the automobile, and braking mechanism independent of the brakes on the automobile adapted to be applied to the rear wheels.

3. An apparatus of the class described, comprising an automobile, means for maintaining such automobile in a position in which the rear wheels are free to revolve, and tires mounted upon the rear wheels possessing an inertia approximating the inertia of the automobile.

4. An apparatus of the class described, comprising an automobile, means for maintaining such automobile in a position where the rear wheels are free to revolve, and braking mechanism independent of the car brakes.

Signed at New York city, in the county of New York and State of New York, this 20th day of August, 1915.

CLIFFORD M. BISHOP.

Witnesses:
 MARGARET A. HECK,
 BENJAMIN T. ABRAMS.